United States Patent
Reynolds, III et al.

(10) Patent No.: US 9,016,043 B2
(45) Date of Patent: Apr. 28, 2015

(54) EXHAUST TREATMENT SYSTEM WITH UREA TEMPERATURE RATIONALITY DIAGNOSTIC

(71) Applicant: Tenneco Automotive Operating Company Inc., Lake Forest, IL (US)

(72) Inventors: James J. Reynolds, III, Ypsilanti, MI (US); Thomas Stephens, Pinckney, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 113 days.

(21) Appl. No.: 13/803,205

(22) Filed: Mar. 14, 2013

(65) Prior Publication Data

US 2014/0260191 A1    Sep. 18, 2014

(51) Int. Cl.
| | | |
|---|---|---|
| F01N 3/00 | (2006.01) | |
| F01N 11/00 | (2006.01) | |
| F01N 3/20 | (2006.01) | |

(52) U.S. Cl.
CPC ............... *F01N 11/00* (2013.01); *F01N 3/208* (2013.01); *F01N 2550/05* (2013.01); *F01N 2560/026* (2013.01); *F01N 2560/06* (2013.01); *F01N 2610/02* (2013.01); *F01N 2610/105* (2013.01); *F01N 2900/0412* (2013.01); *F01N 2900/1806* (2013.01); *F01N 2900/1811* (2013.01); *Y02T 10/47* (2013.01); *Y02T 10/24* (2013.01)

(58) Field of Classification Search
CPC ...................................................... F01N 11/00
See application file for complete search history.

(56) References Cited

U.S. PATENT DOCUMENTS

| | | | |
|---|---|---|---|
| 6,063,350 A | 5/2000 | Tarabulski et al. | |
| 6,408,619 B1 | 6/2002 | Wissler et al. | |
| 6,941,746 B2 | 9/2005 | Tarabulski et al. | |
| 7,776,265 B2 * | 8/2010 | Berryhill et al. | 422/68.1 |
| 8,635,859 B2 * | 1/2014 | Miao et al. | 60/295 |
| 8,850,796 B2 * | 10/2014 | Georis | 60/277 |
| 2008/0022654 A1 | 1/2008 | Broderick et al. | |
| 2008/0087008 A1 | 4/2008 | Reba et al. | |
| 2008/0205478 A1 * | 8/2008 | Sasanuma et al. | 374/44 |
| 2009/0035194 A1 | 2/2009 | Robel et al. | |
| 2009/0205320 A1 | 8/2009 | Mokire et al. | |
| 2009/0293451 A1 | 12/2009 | Kesse | |
| 2010/0024397 A1 | 2/2010 | Chi et al. | |
| 2010/0050606 A1 | 3/2010 | Fulks et al. | |
| 2010/0327884 A1 * | 12/2010 | McCall et al. | 324/682 |

(Continued)

FOREIGN PATENT DOCUMENTS

EP    1662103    5/2006

*Primary Examiner* — Jesse Bogue
(74) *Attorney, Agent, or Firm* — Harness, Dickey & Pierce, P.L.C.

(57) ABSTRACT

A method for monitoring an exhaust after-treatment system that doses an exhaust treatment fluid held from a tank into an exhaust stream. The method includes determining a first temperature of the exhaust treatment fluid in the tank using a temperature sensor. If the first temperature of the exhaust treatment fluid is less than a predetermined temperature, a heater is activated to increase the first temperature of the exhaust treatment fluid. The increasing first temperature is then monitored relative to the predetermined temperature. Then, a second temperature when a phase change of the exhaust treatment fluid occurs is detected. The detected second temperature is then compared to the predetermined temperature to determine whether the exhaust treatment fluid is of sufficient quality, or to determine whether the temperature sensor is rational.

20 Claims, 6 Drawing Sheets

(56) References Cited

U.S. PATENT DOCUMENTS

| | | |
|---|---|---|
| 2011/0047966 A1 | 3/2011 | Zhang et al. |
| 2011/0047986 A1 | 3/2011 | Drasner et al. |
| 2011/0225950 A1 | 9/2011 | McCoy et al. |
| 2013/0037138 A1* | 2/2013 | Geris .......................... 137/551 |

* cited by examiner

US 9,016,043 B2

EXHAUST TREATMENT SYSTEM WITH UREA TEMPERATURE RATIONALITY DIAGNOSTIC

FIELD

The present disclosure relates to an exhaust treatment system with a urea temperature rationality diagnostic.

BACKGROUND

This section provides background information related to the present disclosure which is not necessarily prior art.

Systems for treating exhaust gas produced by an internal combustion engine to reduce exhaust gas emissions in the form of particulates and/or $NO_X$ are generally known. Such exhaust gas "after-treatment" systems may include a selective catalytic reduction (SCR) system for the purpose of reducing the $NO_X$ level of the exhaust gas below a specified level.

An SCR system generally includes a catalytic reducing agent, or reagent, in the form of an exhaust treatment fluid that is dosed into the exhaust gas stream produced by the engine before entering an SCR catalyst. The SCR catalyst reacts with the combination of engine exhaust gas and reagent solution in a known manner to reduce the $NO_X$ content of the exhaust gas stream.

The reagent is generally held in a storage tank. The tank may include fluid level sensors, temperature sensors, and other components that assist in communicating the reagent to a dosing module that doses the reagent into the exhaust gas stream and returning any unused reagent to the tank. Each of these components should be monitored by an on-board diagnostic (OBD) system so that, if a problem with one of the components occurs, an error may be communicated by the OBD system.

SUMMARY

This section provides a general summary of the disclosure, and is not a comprehensive disclosure of its full scope or all of its features.

The present disclosure provides an exhaust after-treatment system for treating an exhaust produced by an engine. The system includes an exhaust treatment component, a dosing module positioned upstream from the exhaust treatment component for dosing an exhaust treatment fluid into the exhaust, an exhaust treatment fluid tank that stores and provides the dosing module with the exhaust treatment fluid, a temperature sensor positioned in the tank for detecting a temperature of the exhaust treatment fluid, a fluid heater positioned in the tank for increasing a temperature of the exhaust treatment fluid, and a controller for controlling each of the dosing module, temperature sensor, and fluid heater.

The temperature sensor determines a first temperature of the exhaust treatment fluid in the tank and communicates the first temperature to the controller. If the first temperature of the exhaust treatment fluid is less than a predetermined temperature, the controller activates the heater to increase the first temperature of the exhaust treatment fluid. The controller then monitors the increasing first temperature of exhaust treatment fluid detected by the temperature sensor relative to the predetermined temperature, and detects a second temperature where a phase change of the exhaust treatment fluid occurs. The controller then compares the detected second temperature to the predetermined temperature. If the detected second temperature is deviated from the predetermined temperature, the temperature sensor may be irrational, or the exhaust treatment fluid may not be of sufficient quality.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 schematically illustrates an exhaust system according to a principle of the present disclosure;

Corresponding reference numerals indicate corresponding parts throughout the several views of the drawings.

DETAILED DESCRIPTION

Example embodiments will now be described more fully with reference to the accompanying drawings.

Figure 1:
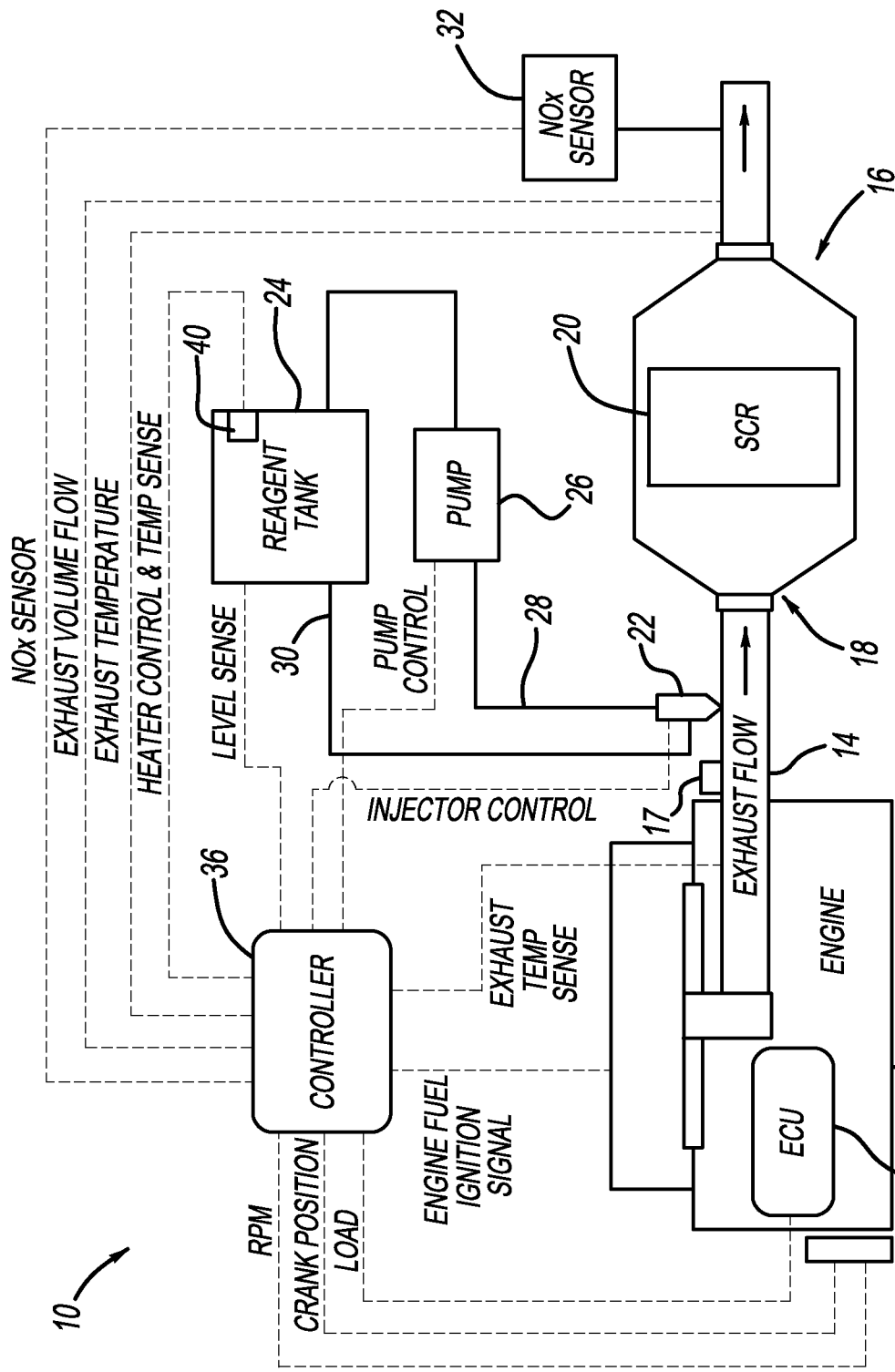

FIG. 1 schematically illustrates an exhaust system 10 according to the present disclosure. Exhaust system 10 can include at least an engine 12 in communication with a fuel source (not shown) that, once consumed, will produce exhaust gases that are discharged into an exhaust passage 14 having an exhaust after-treatment system 16. Downstream from engine 12 can be disposed an exhaust treatment component 18, which can be a DOC, a DPF component or, as illustrated, a SCR component 20. Although not required by the present disclosure, exhaust after-treatment system 16 can further include components such as a thermal enhancement device or burner 17 to increase a temperature of the exhaust gases passing through exhaust passage 14. Increasing the temperature of the exhaust gas is favorable to achieve light-off of the catalyst in the exhaust treatment component 18 in cold-weather conditions and upon start-up of engine 12, as well as initiate regeneration of the exhaust treatment component 18 when the exhaust treatment component 18 is a DPF.

Figure 6:
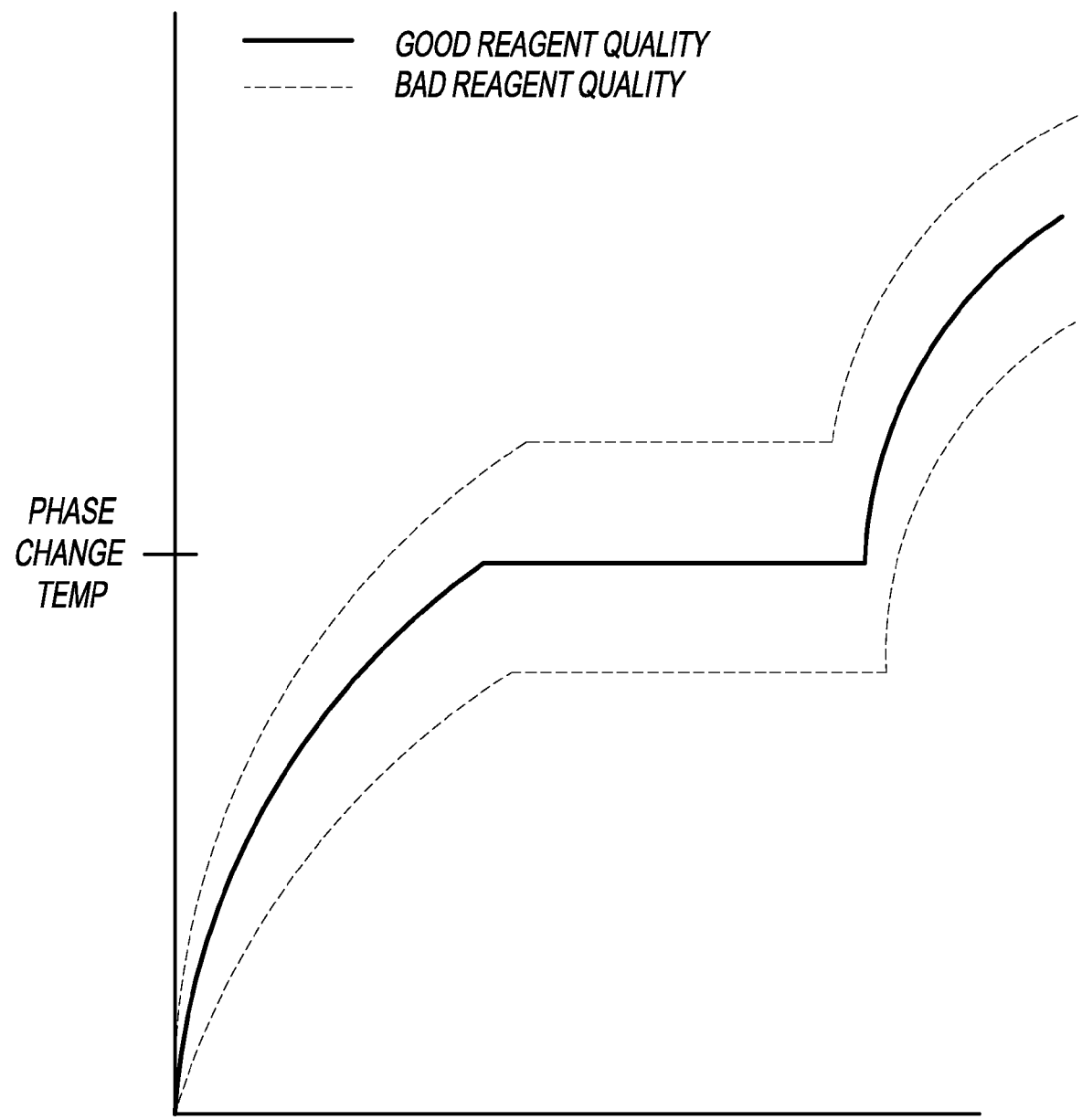
FIG. 6 is a graph illustrating temperature curves that assist in determining whether a reagent is of sufficient quality.

To assist in reduction of the emissions produced by engine 12, exhaust after-treatment system 16 can include a dosing module 22 for periodically dosing an exhaust treatment fluid into the exhaust stream. As illustrated in FIG. 1, dosing module 22 can be located upstream of exhaust treatment component 18, and is operable to inject an exhaust treatment fluid into the exhaust stream. In this regard, dosing module 22 is in fluid communication with a reagent tank 24 and a pump 26 by way of inlet line 28 to dose an exhaust treatment fluid such as diesel fuel or urea into the exhaust passage 24 upstream of exhaust treatment component 20. Dosing module 22 can also be in communication with reagent tank 24 via return line 30. Return line 30 allows for any exhaust treatment fluid not dosed into the exhaust stream to be returned to reagent tank 24. Flow of the exhaust treatment fluid through inlet line 28, dosing module 22, and return line 30 also assists in cooling dosing module 22 so that dosing module 22 does not overheat. As will be described later, dosing modules 22 can be configured to include a cooling jacket (FIG. 6) that passes a coolant around dosing module 22 to cool it.

The amount of exhaust treatment fluid required to effectively treat the exhaust stream can also be dependent on the size of the engine 12. In this regard, large-scale diesel engines used in locomotives, marine applications, and stationary applications can have exhaust flow rates that exceed the capacity of a single dosing module 22. Accordingly, although only a single dosing module 22 is illustrated for urea dosing, it should be understood that multiple dosing modules 22 for urea injection are contemplated by the present disclosure.

The amount of exhaust treatment fluid required to effectively treat the exhaust stream may also vary with load, engine speed, exhaust gas temperature, exhaust gas flow, engine fuel injection timing, desired $NO_X$ reduction, barometric pressure, relative humidity, EGR rate and engine coolant temperature. A $NO_X$ sensor or meter 32 may be positioned downstream from SCR 20. $NO_X$ sensor 32 is operable to output a signal indicative of the exhaust $NO_X$ content to an engine control unit 34. All or some of the engine operating parameters may be supplied from engine control unit 34 via the engine/vehicle databus to an exhaust after-treatment system controller 36. The controller 36 could also be included as part of the engine control unit 34. Exhaust gas temperature, exhaust gas flow and exhaust back pressure and other vehicle operating parameters may be measured by respective sensors, as indicated in FIG. 1.

Figure 2:
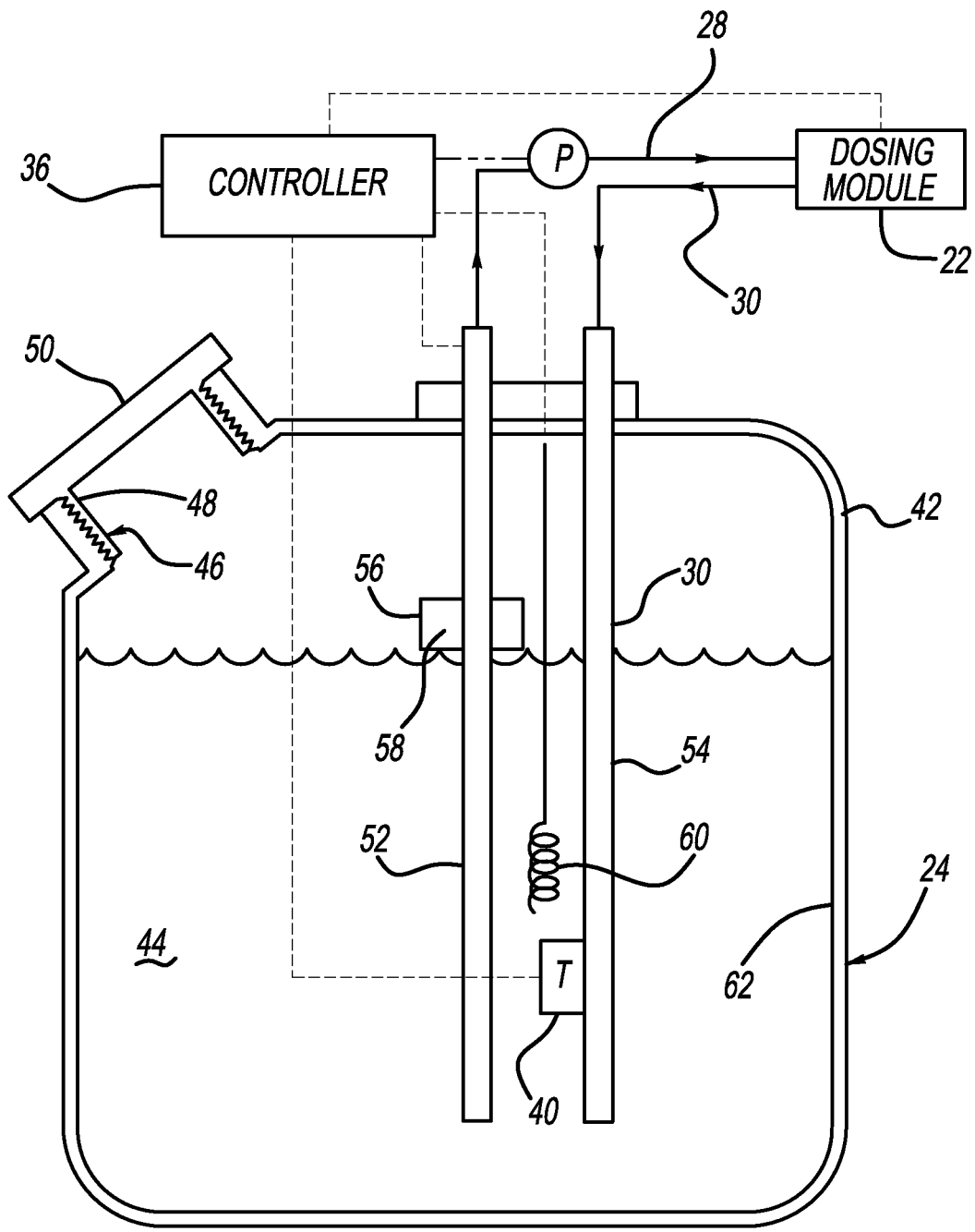
FIG. 2 is a cross-sectional illustration of an exemplary reagent tank that may be used according to a principle of the present disclosure.

A temperature of the exhaust treatment fluid may also be a parameter monitored by exhaust after-treatment system controller 36. To monitor a temperature of the exhaust treatment fluid, reagent tank 24 may include a temperature sensor 40 located therein. As best shown in FIG. 2, reagent tank 24 can include a tank housing 42. Tank housing 42 may be formed of materials such as polyethylene, polystyrene, aluminum, steel, or any other type of material suitable for storing a reagent exhaust treatment fluid 44 such as urea. To re-fill tank 24 with an exhaust treatment fluid, tank 24 may include an inlet 46 defined by a threaded neck 48 that may receive a removable cap 50 having a threading that corresponds to that of neck 48, as is known in the art.

Within tank housing 42 can be a pair of suction and discharge tubes 52 and 54, respectively. Suction tube 52 communicates with pump 26 downstream such that when pump 26 is activated, the urea exhaust treatment fluid 44 is drawn from tank 24 into inlet line 28. As noted above, inlet line 28 communicates with dosing module 22 to provide exhaust treatment fluid to the exhaust stream. If the urea exhaust treatment fluid 44 is not dosed into the exhaust stream, the urea exhaust treatment fluid 44 may travel back to tank 24 through return line 30. Return line 30 communicates with discharge tube 54.

To monitor an amount of urea exhaust treatment fluid 44 in tank 24, a fluid level indicating device 56 may be coupled to inlet tube 52. In the illustrated embodiment, fluid level indicating device 56 may comprise a float member 58 having a density less than that of the urea exhaust treatment fluid 44. To communicate a level of the urea exhaust treatment fluid 44 to controller 36, float member 58 may include a permanent magnet (not shown) embedded or adhered to float member 58. Suction tube 52 may, in turn, include a plurality of magneto-resistive sensors (not shown) along a length thereof that communicate with controller 36.

When float member 58 aligns with a particular magneto-resistive sensor, the sensor can communicate a level of the urea exhaust treatment fluid 44 to controller 36. One skilled in the art will readily acknowledge and appreciate that the above-described fluid level sensing is merely exemplary in nature, and that various other methods and devices may be employed to determine the fluid level. The present disclosure, therefore, should not be limited to the above-described configuration. For example, it should be understood that float member 58 may be coupled to discharge tube 54 and that discharge tube 54 can include magneto-resistive sensors (not shown) without departing from the scope of the present disclosure.

An exhaust treatment fluid heater 60 may also be positioned in tank 24. Fluid heater 60 is designed to raise a temperature of the exhaust treatment fluid 44, particularly in cold-weather conditions where the exhaust treatment fluid 44 can freeze. Fluid heater 60 may be a resistive heater, or may be configured to allow flow of an engine coolant therethrough, without limitation. Fluid heater 60 does not necessarily continuously operate during operation of engine 12. Rather, fluid heater 60 communicates with controller 36 such that fluid heater 60 can be activated as needed. In this regard, a temperature of the exhaust treatment fluid 44 can be transmitted to controller 36 from temperature sensor 40. If the sensed temperature is too low, controller 36 can instruct fluid heater 60 to activate to heat or thaw the exhaust treatment fluid 44.

Temperature sensor 40 may be attached to discharge tube 54. Temperature sensor 40, however, may be positioned anywhere within tank 24 satisfactory to properly determine a temperature of the exhaust treatment fluid 44. For example, temperature sensor 40 can be attached to an interior wall 62 of housing 42, or may be attached to suction tube 52. Regardless, it is preferable that temperature sensor 40 be positioned proximate a center of tank 24 to more accurately determine a temperature of the exhaust treatment fluid 44.

Urea exhaust treatment fluid may be a mixture of urea and water. A solution containing 32.5% urea provides the lowest freezing point for the urea exhaust treatment fluid, which is −11 degrees C. Such a urea exhaust treatment fluid is commonly used in exhaust after-treatment systems to ensure that the exhaust treatment fluid remains in a liquid state in most weather conditions, which enables dosing of the exhaust treatment fluid even during extremely cold temperatures.

Figure 3:
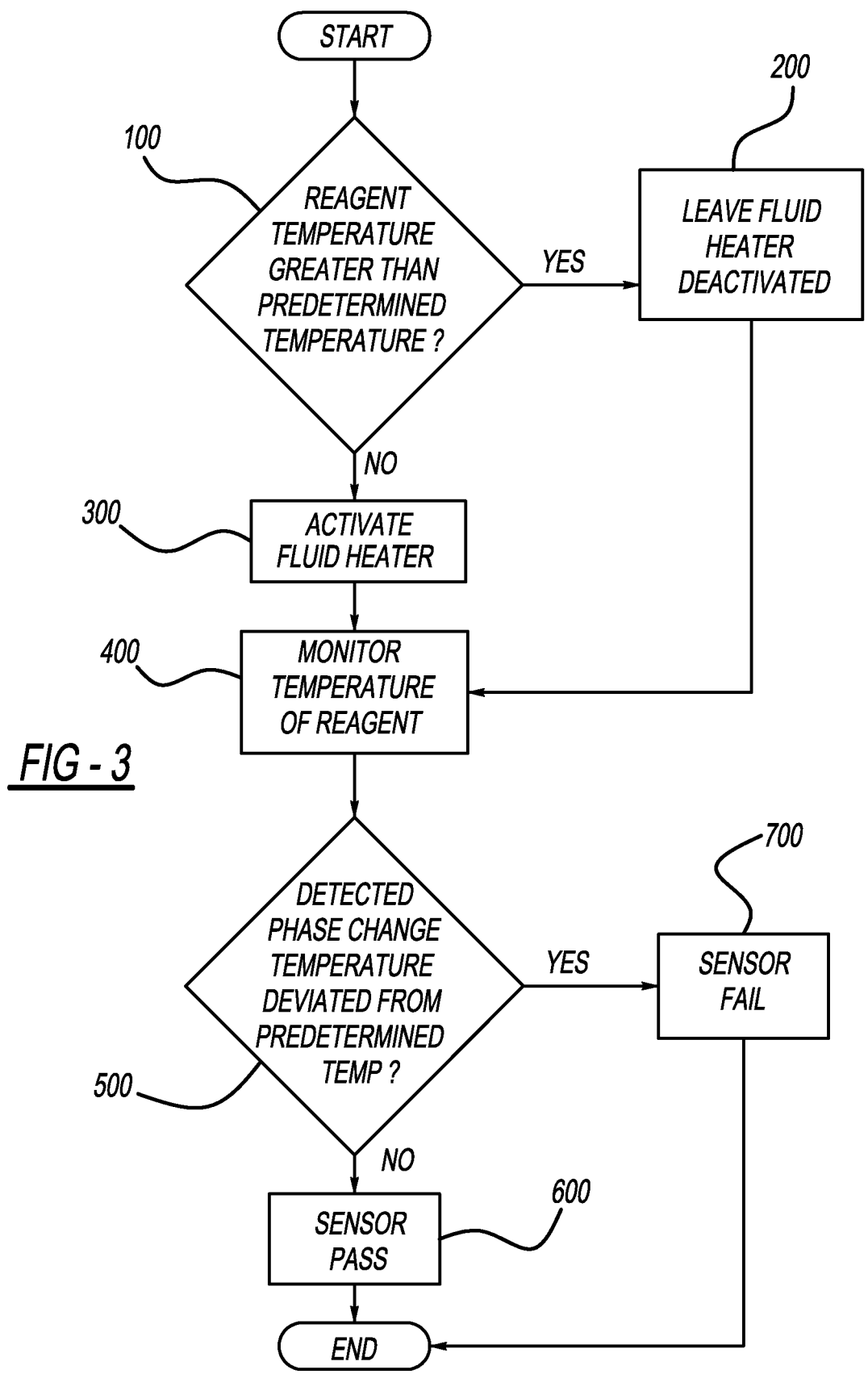
FIG. 3 is a flow chart illustrating a temperature sensor rationality diagnostic method in accordance with a principle of the present disclosure.

The present disclosure provides a diagnostic method for determining whether temperature sensor 40 is rational. FIG. 3 illustrates an exemplary control algorithm for determining the rationality of temperature sensor 40. In step 100, temperature sensor 40 is instructed by controller 36 to determine the temperature of the urea exhaust treatment fluid 44. If the temperature detected by temperature sensor 40 is determined by controller 36 to be greater than a predetermined temperature, fluid heater 60 is not activated (step 200). If fluid heater 60 is already activated, controller 36 deactivates fluid heater 60 (step 200). The predetermined temperature preferably is a temperature at which a phase change (e.g., from solid to liquid, or liquid to gas) occurs.

If the temperature detected by temperature sensor 40 is determined by controller 36 to be less than the predetermined temperature, fluid heater 60 is activated by controller 36 (step 300). Once fluid heater 60 is activated, controller 36 instructs temperature sensor 40 to continually monitor a temperature of the urea exhaust treatment fluid 44 to observe the rate of temperature change (step 400). During heating of the urea exhaust treatment fluid, the urea exhaust treatment fluid 44 will eventually reach a temperature at which a phase change can occur. As the phase change occurs, the temperature of the urea exhaust treatment fluid should plateau for a period of time (e.g., 5-10 minutes). The temperature at which this plateau occurs can be used by controller 36 to determine whether temperature sensor 40 is rational.

Figure 4:
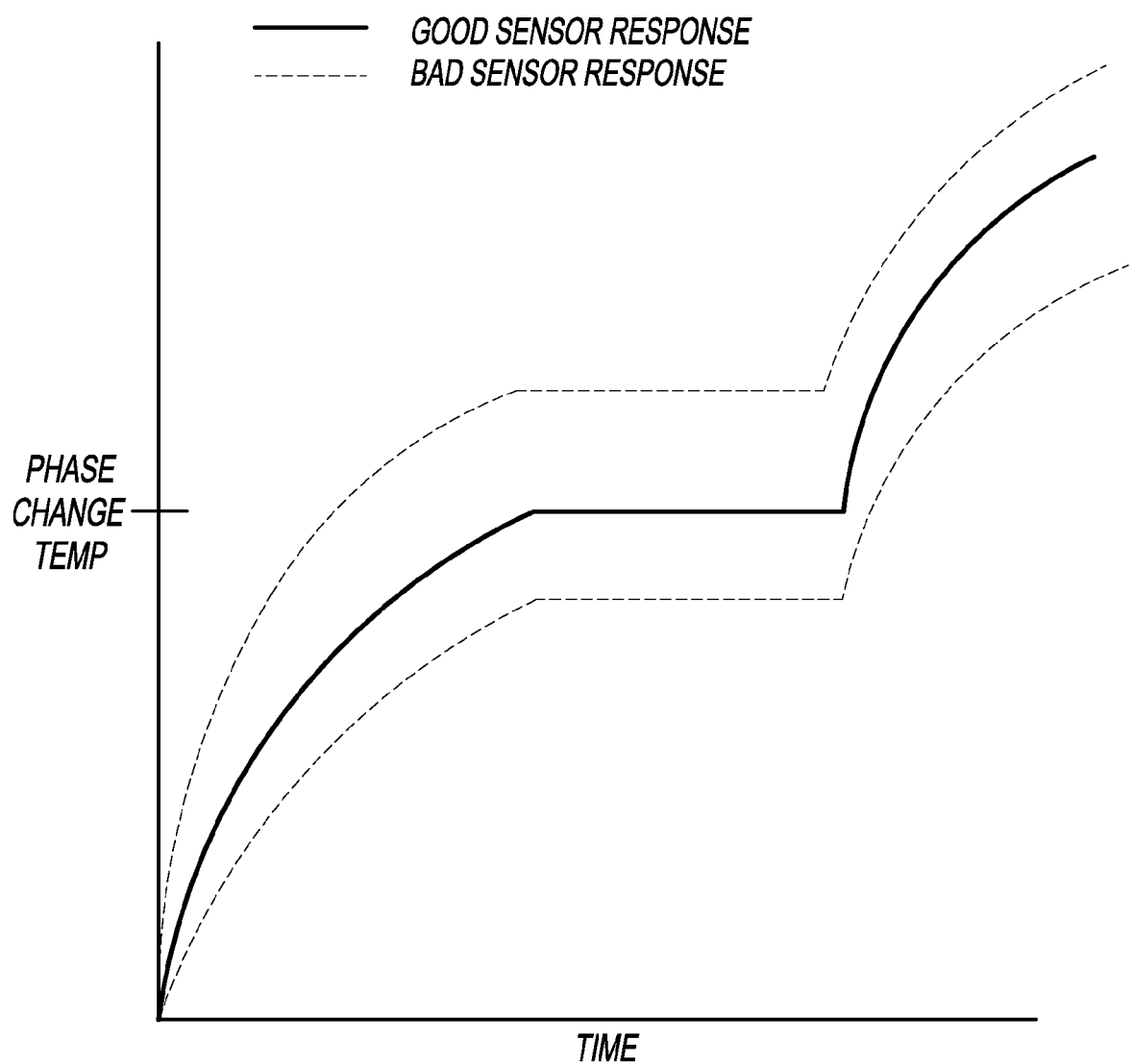
FIG. 4 is a graph illustrating temperature curves that assist in determining whether a temperature sensor is rational.

More specifically, if the temperature at which the phase change occurs has deviated from the predetermined temperature, it can be inferred that temperature sensor 40 is not rational or malfunctioning (step 500). If temperature sensor 40 properly detects a phase change at the predetermined temperature, temperature sensor 40 will pass the rationality diagnostic (step 600). For example, if the initial temperature detected by temperature sensor (step 100) is −15 degrees C., the urea exhaust treatment fluid should undergo a phase change at −11 degrees C. where the solid urea exhaust treatment fluid begins to melt and turn to liquid. If, however, the temperature sensor 40 detects a plateau in temperature at −5 degrees C. or −15 degrees C. (FIG. 4), it can be inferred by controller 36 that temperature sensor 40 is either un-calibrated or malfunctioning. The temperature sensor 40, therefore, would not pass the rationality diagnostic (step 700) and controller 36 can send an error flag to ECU 34 of engine 12 that exhaust treatment system 18 requires servicing, or can signal ECU 34 to cease operation of engine 12. Alternatively, if no plateau is detected during heating of the exhaust treatment fluid 44, controller 36 can infer that temperature sensor 40 is defective. Temperature sensor 40, therefore, would not pass the rationality diagnostic (step 700) and controller 36 can send an error flag to ECU 34 of engine 12.

It should be understood that the above-described diagnostic algorithm can also be used as a diagnostic tool for reagent quality. As noted above, the aqueous urea exhaust treatment fluid preferably has a urea concentration of 32.5% to ensure the lowest freezing point (i.e., −11 degrees C.) for the solution. If a fluid other than urea exhaust treatment fluid is added to tank 24, or if a urea exhaust treatment fluid with a lower urea concentration is added to tank 24, the temperature at which a phase change occurs can be used to determine whether the correct fluid has been added to tank 24.

Figure 5:
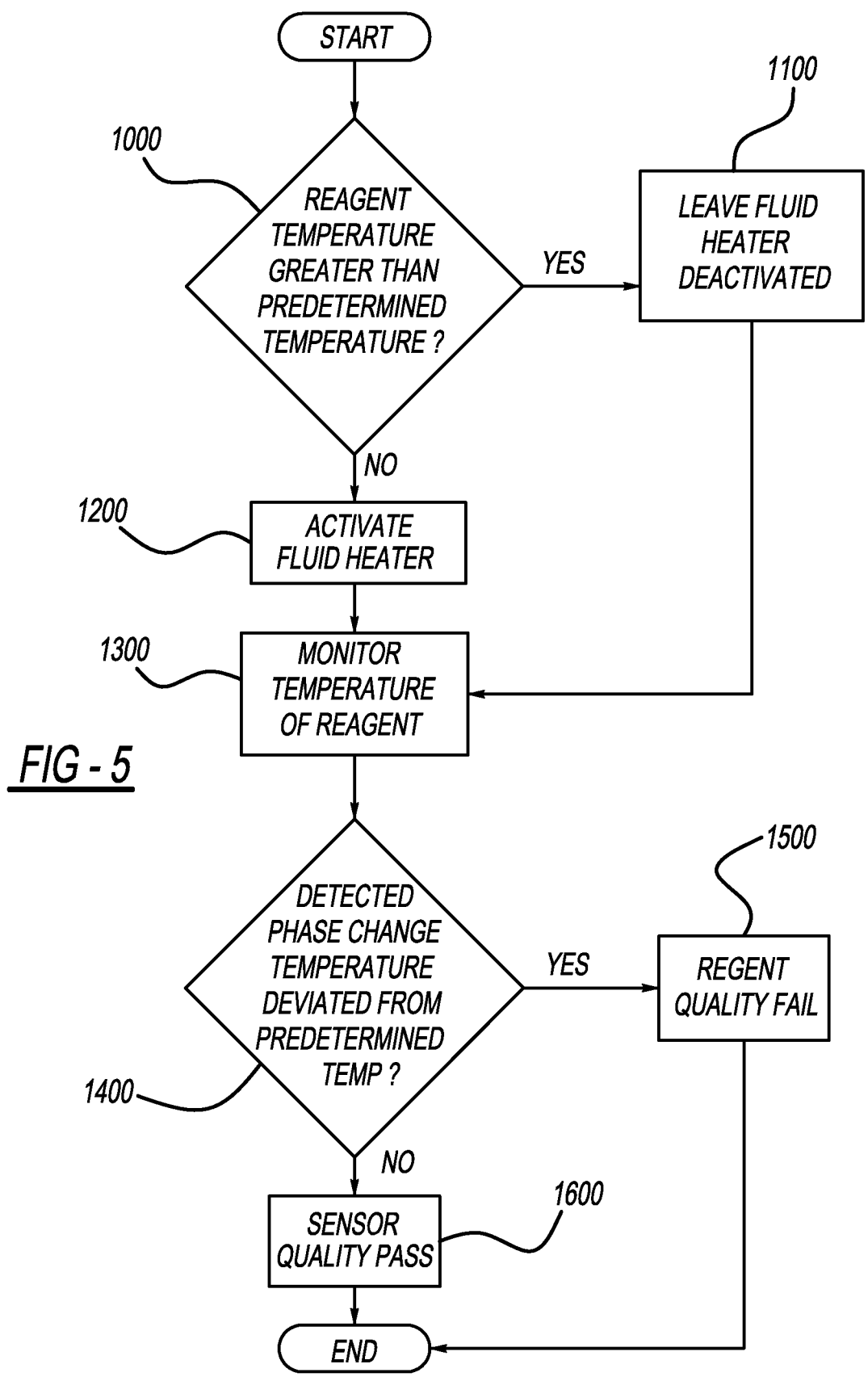
FIG. 5 is a flow chart illustrating a reagent quality diagnostic method in accordance with a principle of the present disclosure.

Now referring to FIG. 5, a reagent quality diagnostic algorithm is illustrated. In step 1000, controller 36 instructs temperature sensor 40 to determine the temperature of the urea exhaust treatment fluid 44. If the detected temperature is determined to be greater than a predetermined temperature, fluid heater 60 is not activated (step 1100). If fluid heater 60 is already activated, controller 36 deactivates fluid heater 60 (step 1100). The predetermined temperature preferably is a temperature at which a phase change (e.g., from solid to liquid, or liquid to gas) occurs.

If the detected temperature is determined to be less than the predetermined temperature, controller 36 activates fluid heater 60 (step 1200). Once fluid heater 60 is activated, controller 36 instructs temperature sensor 40 to continually monitor a temperature of the urea exhaust treatment fluid 44 to observe the rate of temperature change (step 1300). During heating of the urea exhaust treatment fluid, the urea exhaust treatment fluid 44 will eventually reach a temperature at which a phase change can occur. As the phase change occurs, the temperature of the urea exhaust treatment fluid should plateau for a period of time. The temperature at which this plateau occurs can be used to determine whether temperature sensor 40 is rational.

More specifically, if the temperature at which the phase change occurs has deviated from the predetermined temperature (step 1400), it can be inferred that the quality of the reagent is not satisfactory (step 1500). If controller 36 detects a phase change at the predetermined temperature, the reagent quality will pass the diagnostic (step 1600). For example, if the initial temperature detected by temperature sensor (step 1000) is −15 degrees C., the urea exhaust treatment fluid should undergo a phase change at −11 degrees C. where the solid urea exhaust treatment fluid begins to melt and turn to liquid. If, however, controller 36 detects a plateau in temperature at −5 degrees C. (FIG. 6), controller 36 can infer that the incorrect exhaust treatment fluid is being used, or that a fluid that may not be suitable for exhaust treatment (e.g., water) has been added to the tank. The urea exhaust treatment fluid 44, therefore, would not pass the reagent quality diagnostic (step 1600) and controller 36 can send an error flag to ECU 34 of engine 12 that exhaust treatment system 18 requires servicing, or can signal ECU 34 to cease operation of engine 12. Alternatively, if no plateau is detected during heating of the exhaust treatment fluid 44, controller 36 can infer that the incorrect exhaust treatment fluid (e.g., a hydrocarbon) has been added to the tank. The urea exhaust treatment fluid 44, therefore, would not pass the reagent quality diagnostic (step 1600) and controller 36 can send an error flag to ECU 34 of engine 12 that exhaust treatment system 18 requires servicing, or can signal ECU 34 to cease operation of engine 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for monitoring an exhaust after-treatment system that doses an exhaust treatment fluid held from a tank into an exhaust stream, the method comprising:
    determining a first temperature of the exhaust treatment fluid in the tank using a temperature sensor;
    if the first temperature of the exhaust treatment fluid is less than a predetermined temperature, activating a heater to increase the first temperature of the exhaust treatment fluid;
    monitoring the increasing first temperature of exhaust treatment fluid relative to the predetermined temperature;
    determining when a phase change occurs based on the temperature of the exhaust treatment fluid reaching a plateau for a predetermined amount of time while the exhaust treatment fluid is being heated;
    detecting a second temperature when the phase change of the exhaust treatment fluid occurs; and
    comparing the detected second temperature to the predetermined temperature.

2. The method of claim 1, further comprising determining whether the temperature sensor is rational based on the detected second temperature.

3. The method of claim 2, wherein if the detected second temperature is greater than the predetermined temperature, the temperature sensor is irrational.

4. The method of claim 2, wherein if the detected second temperature is less than the predetermined temperature, the temperature sensor is irrational.

5. The method of claim 1, further comprising determining whether the exhaust treatment fluid is of sufficient quality based on the comparison of the detected second temperature and the predetermined temperature.

6. The method of claim 5, wherein if the detected second temperature is greater than the predetermined temperature, the exhaust treatment fluid is not of sufficient quality.

7. The method of claim 5, wherein if the detected second temperature is less than the predetermined temperature, the exhaust treatment fluid is not of sufficient quality.

8. The method of claim 1, wherein the predetermined amount of time at the plateau temperature ranges between 5 and 10 minutes.

9. The method of claim 1, wherein the predetermined temperature is a phase change temperature of the exhaust treatment fluid.

10. The method of claim 1, further comprising determining that the temperature sensor is irrational if no second temperature is detected.

11. An exhaust after-treatment system for treating an exhaust produced by an engine, comprising:
an exhaust treatment component;
an injector positioned upstream from the exhaust treatment component for injecting an exhaust treatment fluid into the exhaust;
an exhaust treatment fluid tank that stores and provides the injector with the exhaust treatment fluid;
a temperature sensor positioned in the tank for detecting a temperature of the exhaust treatment fluid;
a fluid heater positioned in the tank for increasing a temperature of the exhaust treatment fluid; and
a controller for controlling each of the injector, temperature sensor, and fluid heater,
wherein the temperature sensor determines a first temperature of the exhaust treatment fluid in the tank and communicates the first temperature to the controller, and if the first temperature of the exhaust treatment fluid is less than a predetermined temperature, the controller activates the heater to increase the first temperature of the exhaust treatment fluid;
the controller monitors the increasing first temperature of exhaust treatment fluid detected by the temperature sensor relative to the predetermined temperature, and determines whether a temperature plateau is maintained for a predetermined amount of time while the exhaust treatment fluid is being heated to indicate a phase change, the controller detects a second temperature when the phase change of the exhaust treatment fluid occurs; and
the controller compares the detected second temperature to the predetermined temperature.

12. The system of claim 11, wherein the controller determines whether the temperature sensor is rational based on the detected second temperature.

13. The system of claim 12, wherein if the detected second temperature is greater than the predetermined temperature, the controller determines that temperature sensor is irrational.

14. The system of claim 12, wherein if the detected second temperature is less than the predetermined temperature, the controller determines that temperature sensor is irrational.

15. The system of claim 11, wherein the controller determines whether the exhaust treatment fluid is of sufficient quality based on the detected second temperature.

16. The system of claim 15, wherein if the detected second temperature is greater than the predetermined temperature, the controller determines that the exhaust treatment fluid is not of sufficient quality.

17. The system of claim 15, wherein if the detected second temperature is less than the predetermined temperature, the controller determines that the exhaust treatment fluid is not of sufficient quality.

18. The system of claim 11, wherein the exhaust treatment fluid is a urea exhaust treatment fluid.

19. The system of claim 11, wherein the predetermined temperature is a phase change temperature of the exhaust treatment fluid, the predetermined temperature being stored in the controller.

20. The system of claim 11, wherein if a temperature plateau is not reached for the predetermined amount of time, the controller determines that the exhaust treatment fluid is not of sufficient quality.

* * * * *